United States Patent [19]
Guzzetta

[11] 3,931,954
[45] Jan. 13, 1976

[54] PETCOCK

[76] Inventor: Matthew P. Guzzetta, 10425 Loma Rancho Road, La Mesa, Calif. 92077

[22] Filed: Sept. 3, 1974

[21] Appl. No.: 502,390

[52] U.S. Cl............................ 251/109; 251/309
[51] Int. Cl.²............................ F16K 35/04
[58] Field of Search ............ 251/89, 286, 309, 312, 251/180, 181, 101, 107, 109; 137/385, 556.6

[56]           References Cited
           UNITED STATES PATENTS
| | | | |
|---|---|---|---|
| 1,240,586 | 9/1917 | McDowell | 251/181 |
| 2,081,464 | 5/1937 | Stewart | 251/286 X |
| 3,200,836 | 8/1965 | Trefil et al. | 137/385 |

*Primary Examiner*—Henry T. Klinksiek
*Attorney, Agent, or Firm*—Frank D. Gilliam

[57]           ABSTRACT

An improved petcock for controlling the flow of a liquid from a container. The petcock includes a housing comprising an inlet and outlet passage joined at their inner ends by a frusto-conic valve chamber opening external of the housing through a circular passageway. A valve member shapped to conform to the walls defining the valve chamber and circular passageway and positioned therein so as to provide sliding contact therewith when the valve member is selectively rotated. The valve member includes a bore through its base portion for passing liquid when aligned with the inlet and outlet passage and restricting fluid flow when misaligned. Sealing means is provided for sealing the housing to the tank, between a portion of the valve member and the valve chamber and between the circular portion of the valve member and an outer housing cover. Locking means is provided to selectively lock the valve member in either an "on" or "off" selected position. Bias means is provided to force the valve member into seating arrangement with the valve chamber and hold the locking means in lock position.

9 Claims, 7 Drawing Figures

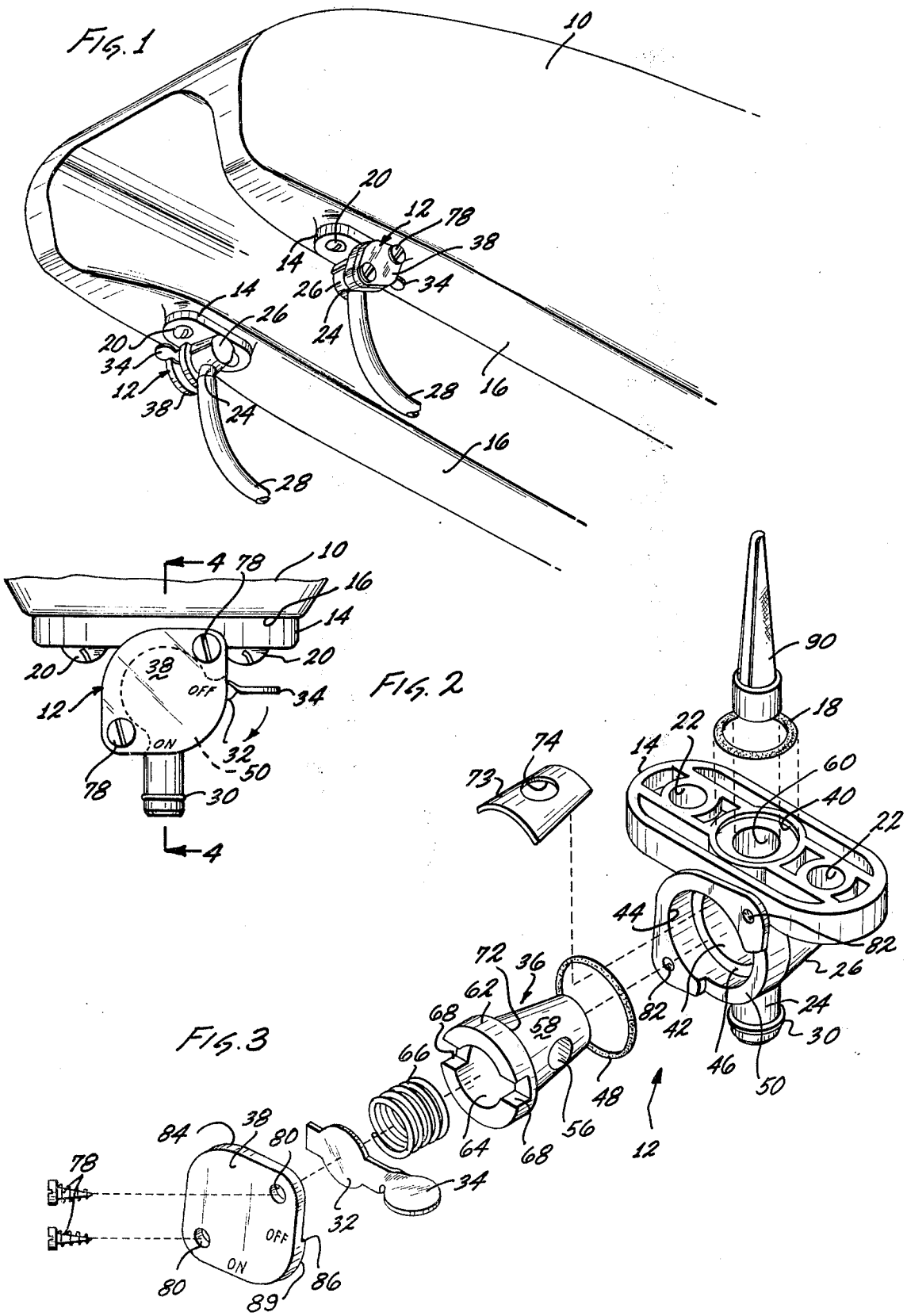

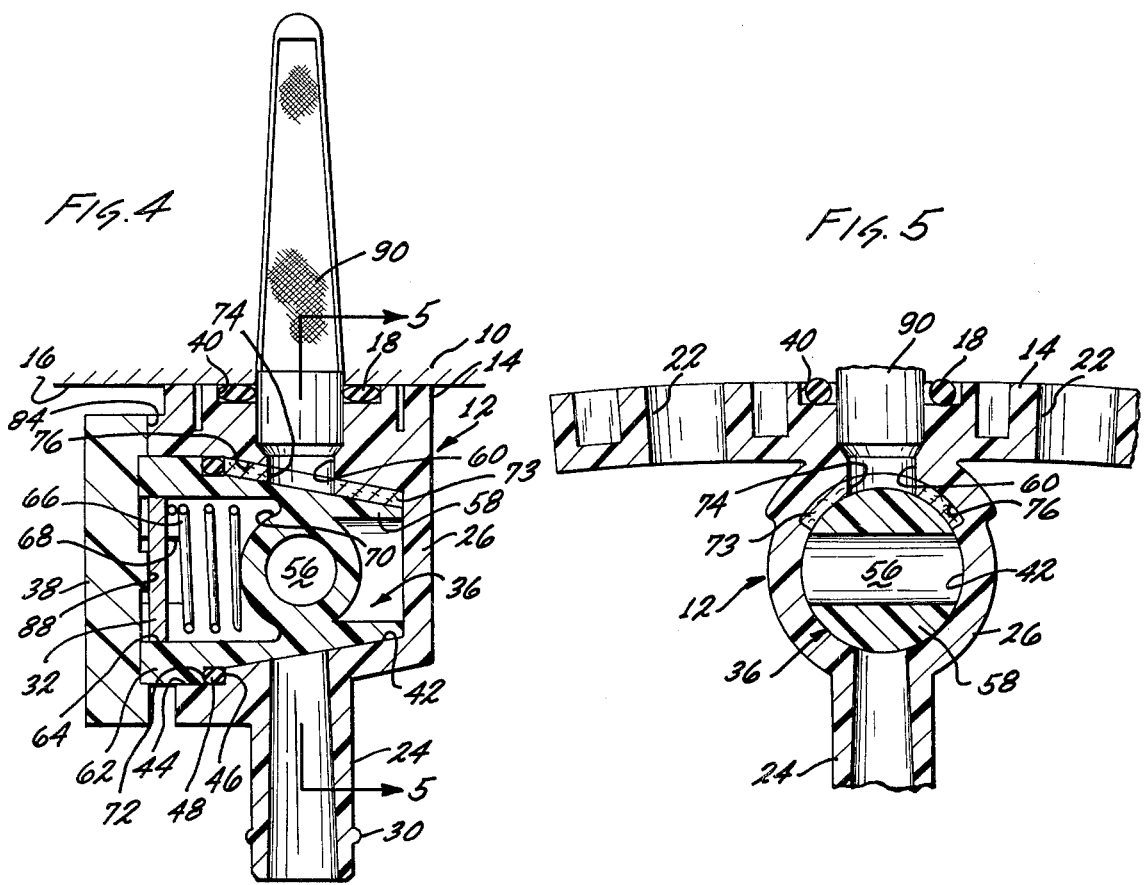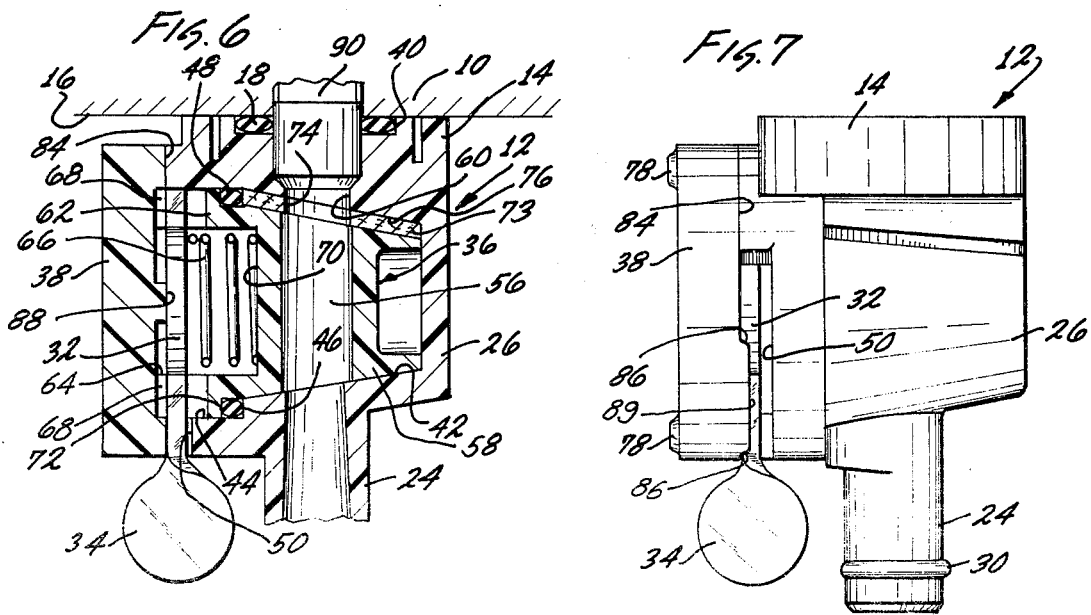

PETCOCK

BACKGROUND OF THE INVENTION

The invention relates to a petcock for controlling the flow of a liquid from a container and more particularly for allowing or preventing the flow of fuel, such as gasoline from a vehicle tank to its engine.

Various types of petcock are commercially available for this purpose; however, they are not completely satisfactory for various reasons.

Some petcock are found to leak fuel external of the valve while others do not entirely cut off the fuel supply from the engine. This problem occurs in some instances when the valve is newly installed or after use when wear between the moving parts has been encountered.

Most presently available petcocks are made from either some type of metal or plastic. The former are found to either gall or bind between the moving parts after prolonged use or when lubrication has not been provided, such as when fuel is removed from the tank for prolonged periods of time. The latter construction almost without exception leaks because of the lubricious nature of the material and the lack of a suitable seal.

Existing petcock are not provided with a simple efficient means for providing positive locking action when switched from "on" to "off" or vice versa. The available valves tend to vibrate from the selectively placed position when being driven on rough terrain or transported aboard a trailer or carrying means. This of course results in a loss of fuel into the vehicle or the shutting off of fuel from an operating vehicle when fuel is required.

These and other problems had not been satisfactorily resolved until the emergence of the instant invention.

SUMMARY OF THE INVENTION

This invention relates to an improved petcock having improved sealing features that can be applied to petcocks constructed of any convenient material to prevent fuel leakage as encountered in the art.

There is additionally provided a positive means for locking the petcock valve in either an "on" or "off" condition that can only be moved to the other position by an intentional manual action.

With the above and other objects, features and advantages of this invention, the same consists in the construction combination and arrangement of parts all as hereinafter more fully discribed and illustrated.

BRIEF DESCRIPTION OF THE DRAWINGS

FIG. 1 is a partial perspective view of a fuel tank employing the petcock of the instant invention.

FIG. 2 is a side view of the petcock of the invention.

FIG. 3 is a perspective exploded view of the petcock.

FIG. 4 is a cross-sectional view of the petcock.

FIG. 5 is a partial cross-sectional view of the showing of FIG. 4 taken along line 5—5.

FIG. 6 is a partial cross-sectional view of FIG. 4.

FIG. 7 is a side view of the petcock.

DETAILED DESCRIPTION OF THE PREFERRED EMBODIMENTS OF THE INVENTION

The same reference numerials have been used throughout the specifications for denoting the same part.

Referring now to FIGS. 1 and 2 as well as like components in the various other Figures, there is shown a partial fuel tank 10 with a pair of petcocks 12 attached. Mounting flange 14 is shown in a close sealed relationship with the opening (not shown) in the lower surface 16 of the fuel tank 10 to prevent leakage between them. A seal 18 is provided between flange 14 and the fuel tank surface 16. The seal 18 will be described hereinafter in detail as well as the bowed features of the flange 14 aiding in the positive sealed relationship. Threaded bolts 20 (heads shown) pass through holes 22 (see FIGS. 3 and 5) in the flange member 14 and are threadedly engaged with a receiving member embedded (not shown) in the tank structure. Although this mounting method is shown and described any other convenient mounting means known in the art could be used equally as well for this purpose.

An outlet passage 24 is provided in the outer surface of the petcock housing 26 remotely positioned from the mounting flange 14. Fuel lines 28 are shown attached to the outlet passage and they terminate (not shown) remote from the petcock. The enlarged ridge 30 on the outlet passage 24 is to aid in providing a positive securring of the fuel line to the outlet passage.

A manually operated actuator 32 is provided with an outer portion 34 positioned external from the petcock's outer surface for easy access by the operator. A portion of the actuator 32 is engaged with and encloses the end of the valve member 36 (see FIGS. 3–6) as hereinafter discussed. When the petcock 12 is in its off position (fuel cut off) the outer portion 34 of the actuator 32 is positioned transverse to the normal flow through the petcock indicating a restricted flow and when the petcock is on (fuel flows) the direction of the actuator outer portion 34 is in the direction of flow indicating an on condition.

FIG. 3 is a perspective exploded view of the components comprising the petcock assembly. The petcock housing 26 and housing cover 38 confine the majority of the working parts within the petcock. The housing 26 has holes 22 through mounting flange 14 for mounting in a manner hereinbefore described.

The flange 14 is slightly bowed (see FIG. 5) and has a shoulder 40 provided for retaining the O ring seal 18. The O ring can be constructed of any compressable material such as rubber or neoprene. When the flange 14 is mated to the lower surface 16 of tank 10 the bolts 20 compress the O ring against the lower tank surface 16 sealing the mounting flange 14 against the tank thereby providing a positive seal with the tank opening. The bowed flange 14 provides maximum force at the seal 18 when the petcock 12 is mounted to the tank 10 as shown in the various figures.

A valve chamber 42 is positioned near the center of the housing 26 above the outlet passage 24. The valve chamber 42 is frusto-conical in cross-section (see the various figures) and opens outwardly at its large diameter end portion to a circular passage 44 of greater diameter. The diameter difference provides a shoulder 46 for O ring 48 hereinafter described. A portion 50 is provided in the outer end surface of the circular passage 44. This is to provide a passage way for the outer portion 34 of the actuator 32 when the housing cover 38 is attached to the housing 26 as hereinafter described.

The valve member 36 is configured to fit within valve chamber 42 and circular passageway 44 for rotational movement when operating the petcock. A bore 56 is provided through the base portion 58 to allow fuel flow therethrough when the bore 56 is co-axial with the inlet passage 60 and outlet passage 24. The outer end surface 62 of the valve member 36 has a circular recess 64 to snuggly receive a coil spring 66 (hereinafter described) and slots 68 on each side of recess 64 on the outer surface of the valve member 36. The spring 66 fits between the bottom of the recess 70 and actuator member 32.

A second O ring 48 constructed from the same material as O ring 18 is positioned between the inner surface 72 of the outer portion of the valve member 36 and is retained against shoulder 46.

A gasket 73, made from any convenient material known in the art, is provided for placement between a portion of the valve chamber 42 and the valve member 36 to provide a seal therebetween. The gasket has a hole 74 through its center portion for alignment with the inlet passage 60 when installed in the valve chamber 42 as hereinafter discussed. The valve chamber is provided with a cut away surface portion 76 (shown in various figures) for retaining gasket 73 when the valve member is rotated. The thickness of the gasket material is slightly greater than the depth of cut away 76 to insure a compressive fit against the valve member 36.

A housing cover 38 confines the various components in their shown positional relationship within the housing 26. Screws 78 are shown for passing through holes 80 through the cover for threaded engagement with the openings 82 in the housing. Any other convenient cover mounting means may be used for this purpose. The inner surface 84 of the cover is provided with two shoulder portions 86 with a projecting surface 89 therebetween. The outer surfaces of cutout portions 86 oppose the outer extremities of the portion 50 of housing 26. The portions 86 provide simple locking positions for the actuator member 32 by capturing its outer portion 34 therein. It should be noted that the surface 89 does not have contact with the housing thus allowing the actuator member 32 to pass therebetween when manually moved as hereinafter discussed. A bearing surface or boss 88 is provided to allow ease of rotational movement of the spring biased actuator 32 from on to off positions.

A fuel filter 90 shown is placed in line with the fuel flow through the petcock for fuel filtering. The filter is confined between the mounting flange 14 in part by a close tolerance fit in inlet passage 60, O ring 18 and a shoulder within the tank opening not shown.

FIG. 4 is a cross-sectional showing a side view of the assembled components shown in FIG. 3. The bore 56 in valve member 36 is shown in its out of alignment off position. The purpose of spring 66 can be readily seen from this figure as well as FIG. 6. When the petcock is assembled the spring 66 is compressed between recess bottom 70 and the actuator 32. In this compressed configuration the O ring 48 is compressed between the valve member 36 and shoulder 46 sealing the valve chamber from external leaks. The gasket 73 is likewise compressed between the valve member 36 and valve chamber 42 as spring 66 forces the two together. The spring being positioned between the valve member 36 and the actuator 32 forces the actuator against the inner surface 48 of the housing cover 38 in the on or off position preventing the outer portion 34 from moving over a shoulder portion 86 to the surface 89, thereby serving as a detent for the on or off position. O ring 18 is shown in its compressed configuration.

FIG. 5 clearly shows the mounting holes 22, bowed mounting flange 14, cut away surface portion 76, bore 56 in its off position, inlet and outlet passages 60 and 24 respectively, and gasket 73.

FIG. 6 shows the various components of the petcock, bore 56 in the on position and actuator outer portion 34 externally indicating an on condition.

FIG. 7 clearly shows the enlarged surface 89 between shoulder portions 86 for preventing unwanted movement of the valve member from a selected position to the other. The outer portion 34 of actuator member 32 indicates that the petcock is in an on condition.

The operation of the valve as explained should be obvious. A simple explanation follows.

When the actuator 32 is locked in the on position as shown the actuator is pushed inward toward the outlet passage 24 until it can be rotated upward along surface 89 and released beyond the off shoulder portion 86. The spring bias again forces the actuator against surface 84 preventing accidental movement.

The invention may be embodied in other specific forms without departing from the spirit or essential characteristics thereof. The present embodiment is therefore to be considered in all aspects as illustrative and not restrictive, the scope of the invention being indicated by the appended claims rather than the foregoing description, and all changes which come within the meaning and range of equivalency of claims are therefore intended to be embraced therein.

What is claimed and desired to be secured by United States Letters Patent is:

1. An improved petcock for liquid flow control comprising:

a housing having a mounting flange for mating with a container having a supply of liquid therein and an orifice through one wall, an inlet passage leading from said orifice to a frusto-conic valve chamber within said housing, said chamber having its larger end portion terminating at a co-axial tubular passageway through one wall of said housing, said passageway having a greater diameter than said larger end portion of said chamber forming a shoulder therebetween the wall of the outer end of said passageway having a cut out along a portion thereof and an outlet passage leading from said chamber and terminating external of said housing, said outlet passage being co-axial with said inlet passage and perpendicular to the axis of said chamber;

a valve member positioned within said chamber and said passageway and conforming thereto for rotational sliding engagement therewith, said valve member having a bore through its longitudinal axis perpendicular to said chamber axis, a recess in the end surface of said passageway conforming end portion of said valve member and an open slot thereon, said slot having its axis parallel with the axis of said bore;

a first sealing means positioned between at least a portion of said chamber and said valve member said first sealing means having an aperture therethrough aligned with the axis of said passages for allowing said liquid to flow therethrough while preventing liquid seepage between said chamber and said valve member;

a second sealing means positioned between said valve means and said shoulder and confined thereby providing a liquid seal therebetween;

an operating lever having a portion positioned and confined within said slot covering said recess with a portion extending through said cut out portion terminating external of said housing for manually rotating said valve member from a first position wherein said bore of said valve member is co-axial with said passages allowing said liquid to flow therethrough to a second position wherein said axis of said bore is rotated out of alignment with said axis of said passages restricting the flow of said liquid into said chamber;

a compressible bias means positioned within said recess and confined and compressed therein by said lever; and a housing cover attached to said housing, said cover closing said tubular opening and thereby confining said lever, both of said sealing means and said valve member within said housing and said passageway and compressing said bias means wherein said first seal is partially compressed between the wall of said chamber and said valve member, said second sealing means is forced against said shoulder by said valve member sealing said valve chamber and said lever is forced against the inside surface of said cover wherein locking means carried by said cover and positioned adjacent said cut out selectively locking said lever in one of said positions of said valve member.

2. The apparatus of claim 1 wherein said mounting flange is laterally bowed toward said valve chamber.

3. The apparatus of claim 2 wherein said first seal means is formed from compressible gasket material and said second and third seal means are compressible O rings.

4. The apparatus of claim 1 wherein said chamber includes an indentation for confining said first sealing means said first sealing having a thickness sufficient to extend from said indentation.

5. The apparatus of claim 1 wherein said bias means is a coil spring.

6. The apparatus of claim 1 wherein said housing and said valve member are formed from lubricious material.

7. The apparatus of claim 6 wherein said lubricious material is plastic.

8. The apparatus of claim 1 wherein said locking means comprises a pair of shoulders connected by a raised surface, said shoulders are positioned one at said first and the other at said second position of said valve member.

9. An improved petcock for liquid flow control comprising:

a housing having a laterally bowed mounting flange for mating a container having a supply of liquid therein and an orifice through one wall thereof, an outlet passage leading from said orifice to a frusto-conic valve chamber within said housing said chamber having its larger end portion terminating at a co-axial tubular passageway through one wall of said housing said passageway having a greater diameter than said end portion of said chamber whereby a shoulder is formed therebetween, the wall of the outer end of said passageway having a cut out surface along a portion thereof and an outlet passage leading from said chamber and terminating external of said housing, said outlet passage being co-axial with said inlet passage and perpendicular to the axis of said chamber;

a valve member positioned within said chamber and said passageway and conforming thereto for rotational sliding engagement therewith, said valve member having a bore through its longitudinal axis perpendicular to said chamber axis, a recess in the end surface of said valve member its passageway conforming end portion and an open slot thereon, said slot having an axis parallel with the axis of said bore;

a gasket seal positioned between a portion of said chamber and said valve member, said sealing means having an aperture therethrough aligned with the axis of said passage for allowing said liquid to flow therethrough while preventing liquid seepage between said chamber and said valve member;

a compressible O ring seal positioned between said valve means and said shoulder and confined thereby providing a liquid seal therebetween;

an operating lever having a portion positioned and confined within said slot covering said recess with a portion extending through said cut out and terminating external of said housing for manually rotating said valve member from a first position wherein said bore of said valve member is co-axial with said passages allowing liquid to flow therethrough to a second position wherein said bore is rotated out of alignment with said axis of said passages restricting the flow of said liquid into said chamber;

a coil spring positioned within said recess and confined and compressed therein by said lever; and a housing cover attached to said housing said cover closing said tubular opening in said housing and thereby confining said lever, said gasket, said O ring and said valve member within said housing and said passageway and compressing said bias means wherein said gasket is partially compressed between the wall said chamber and said valve member, said O ring is forced against said shoulder by said valve member sealing said valve chamber and said lever is forced into one of a pair of areas on said cover separated by a raised surface on said cover thereby locking said lever into one of said positions of said valve member.

* * * * *